United States Patent [19]
Whittler

[11] 3,756,623
[45] Sept. 4, 1973

[54] HEAT SHIELD FOR A MOTORCYCLE

[76] Inventor: Larry Dale Whittler, 11515 N.W. 27th Avenue, Miami, Fla. 33167

[22] Filed: Aug. 28, 1972

[21] Appl. No.: 284,289

[52] U.S. Cl. ............................... 280/289, 180/33 R
[51] Int. Cl. ............................................. B62j 23/00
[58] Field of Search ................. 180/33 R, 33 A, 35, 180/64 A; 280/289

[56] References Cited
UNITED STATES PATENTS
3,517,764   6/1970   Wenot .............................. 180/33 R Primary Examiner—Evon C. Blunk
Assistant Examiner—James W. Miller
Attorney—John Cyril Malloy

[57] ABSTRACT

A heat sheild to be connected to a motorcycle frame and extending over the exhaust of the motor vehicle so that the motorcycle can accommodate a passenger riding behind the driver without being burned by the exhaust pipe of the motorcycle, the heat shield comprising a surface to overlay the exhaust in spaced relation and including means to connect the same to the motorcycle.

3 Claims, 4 Drawing Figures

PATENTED SEP 4 1973 3,756,623

HEAT SHIELD FOR A MOTORCYCLE

FIELD OF THE INVENTION

This invention relates to motorcycles and more particularly to a heat shield for connecting to the motorcycle to overlay the exhaust of the motor vehicle in spaced relation so that the vehicle can accommodate a passenger riding behind the driver.

BACKGROUND OF THE INVENTION

As is perhaps well known motocycles do not have much room for passengers. Ordinarily a passenger rides behind the driver. There is a danger of being burned when one sits on the rear portion of the driver's seat, since the exhaust of the motorcycle extends rearwardly below the seat and the inside surface of the thigh of a passenger can easily be burned if it comes in contact with the exhaust. This invention provides a heat shield which companionately cooperates with the muffler housing of a motorcycle and in effect extends it beneath the rear portion of the driver's seat, the heat shield comprising a roof and side wall which are spaced from the hot surface of the exhaust so that a passenger touching the heat shield with his leg will not be burned.

OBJECTS OF THE INVENTION

It is the general object of this invention to provide a heat shield for the longitudinally extending rearmost portion of the exhaust of a motorcycle which shield includes an abutment surface to overlay a surface of the motorcycle inboard of the exhaust which includes mounting means to connect to the motorcycle and a roof and side wall extending in spaced relation from the exhaust in an outboard direction and downwardly relative to the exhaust, so that a passenger riding on the rear part of a motor vehicle seat will not be burned.

In accordance with these and other objects which will become apparent hereinafter, the instant invention will now be described with reference to the accompanying drawings.

DETAILED DESCRIPTION OF THE INVENTION

Figure 1:
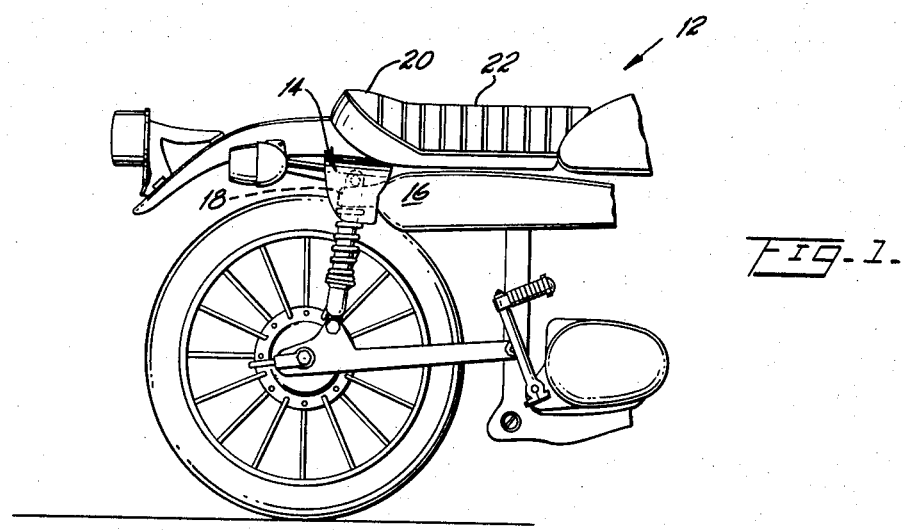
FIG. 1 is a partial view of the rearmost portion of a motorcycle.
Figure 2:
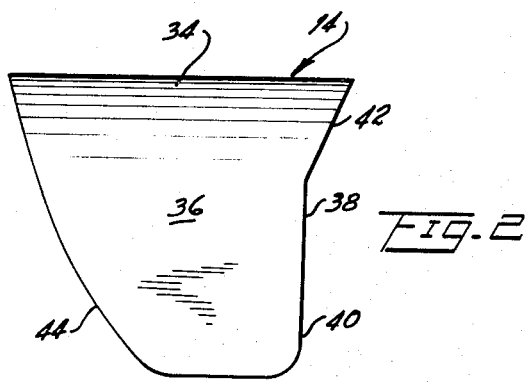
FIG. 2 is an outboard elevation view of the heat shield of the instant invention.
Figure 3:
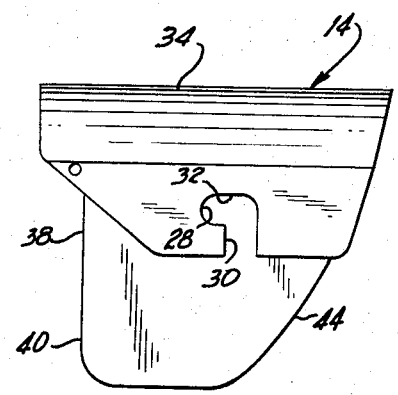
FIG. 3 is an inboard elevation view of the heat shield of the instant invention.

Referring to the drawings wherein like reference characters designate like or corresponding parts throughout the several views, the numeral 12 generally designates the rear portion of a motorcycle while the numeral 14 designates the heat shield. As is apparent from FIG. 1, the heat shield extends longitudinally rearwardly from the rearmost portion 16 of the muffler protectively overlaying in spaced relation therefrom the exhaust 18 of the vehicle, which is in use has a high surface temperature. A person seated on the rearmost portion 20 of the seat 22 of the motorcycle is thus provided with protection from the hot exhaust, so that he will not be burned.

Figure 4:
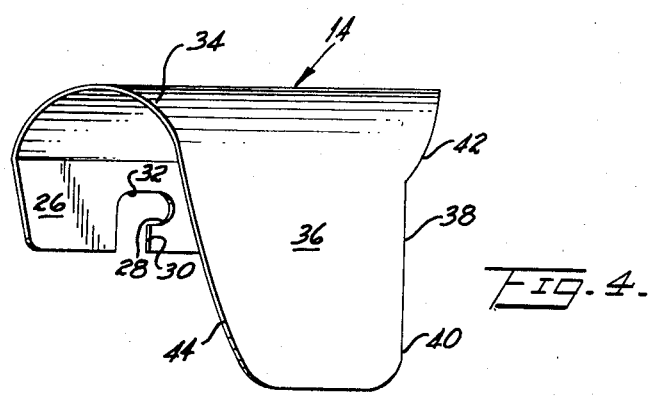
FIG. 4 is a perspective view of the heat shield showing its construction and configuration.

The heat shield is generally best seen in FIG. 4. It is seen to comprise an abutment surface 26 to overlay the conventional surface of the frame of the motorcycle inboard of the heat shield, the abutment surface including mounting means 28, which may be an upwardly directed slot 30 which is enlarged in a longitudinal direction, as at 32, to slide over the head of a mounting screw which is then tightened. The heat shield includes a roof 34 of arcuate configuration which extends upwardly and outwardly from the abutment surface in spaced relation above the exhaust of the motorcycle and thence downwardly in a skirt 36 which overlays the outboard side of the exhaust in spaced relation. The leading or forward edge 38 of the heat shield is configured to companionately mate with the surface of the conventional muffler on the motorcycle involved and, preferably includes a downwardly extending edge 40 which, at its upper end traces a fair curve 42 so as to match the arcuate surface of the muffler housing at about the juncture of the exhaust portion and muffler of the motorcycle. The rearmost portion of the shield defines a fair curve indicated by the numeral 44 which is decorative generally and curved so as to provide a pleasing and smooth appearance while the distance between the edges 38 and 44, that is between the leading edge and the trailing edge, is sufficient to provide an extension which protects against burns from the hot exhaust. The shield is extremely colored to harmonize with the color scheme of the motorcycle.

What is claimed is:

1. A heat shield for the longitudinally extending rearmost portion of the exhaust of a motorcycle which has a rear part of the operator's seat above the exhaust portion, said shield comprising: an abutment surface to overlay a surface of the motor vehicle inboard of the exhaust portion, the abutment surface including mounting means to connect to the surface, a roof of arcuate configuration extending upwardly on the inboard side of the exhaust portion in spaced relation therefrom, outwardly above the exhaust portion and downwardly in spaced relation of the exhaust portion and including a skirt which extends generally vertically downwardly in spaced relation on the outboard side of the exhaust of the motorcycle.

2. The heat shield as set forth in claim 1 wherein the mounting means comprise a vertical slot having a longitudinally extending portion at its upper end to accommodate and nest over a headed screw on the frame of the surface of the motorcycle.

3. The device as set forth in claim 1 wherein the roof and skirt have a leading and a trailing edge and the leading edge is curved to mate with the rearmost portion of the manifold of a motorcycle to provide a generally continuous surface, the heat shield, when mounted to a motorcycle comprising an extension of the muffler housing surface of the motorcycle.

* * * * *